(12) United States Patent
Bouchier et al.

(10) Patent No.: US 10,782,542 B2
(45) Date of Patent: Sep. 22, 2020

(54) METHOD FOR CONTROLLING AN OPHTHALMIC SYSTEM ON THE BASIS OF A MEASUREMENT AND INFORMATION OBTAINED BY AN EXTERNAL ELECTRONIC DEVICE

(71) Applicant: Essilor International, Charenton-le-Pont (FR)

(72) Inventors: Aude Bouchier, Charenton (FR); Stephane Perrot, Charenton (FR); Jerome Ballet, Charenton (FR); David Escaich, Charenton (FR); Samuel Archambeau, Charenton (FR); Willy Chaudat, Charenton (FR); Jean-Paul Cano, Charenton (FR)

(73) Assignee: Essilor International, Charenton-le-Pont (FR)

( * ) Notice: Subject to any disclaimer, the term of this patent is extended or adjusted under 35 U.S.C. 154(b) by 88 days.

(21) Appl. No.: 16/067,197

(22) PCT Filed: Dec. 22, 2016

(86) PCT No.: PCT/EP2016/082468
§ 371 (c)(1),
(2) Date: Jun. 29, 2018

(87) PCT Pub. No.: WO2017/114759
PCT Pub. Date: Jul. 6, 2017

(65) Prior Publication Data
US 2019/0011730 A1 Jan. 10, 2019

(30) Foreign Application Priority Data
Dec. 30, 2015 (EP) .................................... 15307169

(51) Int. Cl.
*G02C 7/10* (2006.01)
*G02C 7/08* (2006.01)

(52) U.S. Cl.
CPC ............. *G02C 7/101* (2013.01); *G02C 7/083* (2013.01)

(58) Field of Classification Search
CPC .............................. G02C 7/101; G02C 7/083
(Continued)

(56) References Cited

U.S. PATENT DOCUMENTS 8,960,898 B1 2/2015 Etzkorn et al.
2014/0340630 A1 11/2014 Pugh et al.
2015/0358614 A1 12/2015 Jin

FOREIGN PATENT DOCUMENTS

WO WO 2015/186010 A1 12/2015

OTHER PUBLICATIONS

International Search Report dated Mar. 1, 2017, in PCT/EP2016/082468, filed Dec. 22, 2016.

*Primary Examiner* — Tuyen Tra
(74) *Attorney, Agent, or Firm* — Oblon, McClelland, Maier & Neustadt, L.L.P.

(57) ABSTRACT

A method for controlling an ophthalmic system including at least one optical element, at least one measuring sensor, at least one interface for communication with a communicating external electronic device, and at least one processor connected to the optical element and used to control a variation of a functionality relating to the optical element. The method includes: obtaining at least one measurement using the sensor, selecting at least one piece of information obtained by a communicating external electronic device, determining an instruction based on the measurement acquired by the sensor and the information obtained by the communicating external electronic device, and executing the instruction by (Continued)

the processor to control the variation of the functionality relating to the optical element.

16 Claims, 2 Drawing Sheets

(58) Field of Classification Search
USPC .................................................... 351/41, 44
See application file for complete search history.

METHOD FOR CONTROLLING AN OPHTHALMIC SYSTEM ON THE BASIS OF A MEASUREMENT AND INFORMATION OBTAINED BY AN EXTERNAL ELECTRONIC DEVICE

The invention relates to an ophthalmic system comprising at least one optical element, such as a spectacle lens, for which the control of a variation of a functionality is improved.

Ophthalmic systems are known, such as frames comprising electrochromic lenses, for which the value of the transmission can vary automatically as a function of the ambient brightness in which the user finds themself. The electrochromic lens is linked electrically to an autonomous control processor and to one or more sensors adapted to measure a luminous flux, the processor being adapted to control the transmission value of the variable-transmission lens as a function of the measured luminous flux.

However, it is difficult to effectively control such an ophthalmic system as a function of the luminous flux measured by means of its sensors alone. Indeed, the sensors integrated into the frame do not necessarily give a sufficiently precise measurement, for example when the sensors are poorly positioned with respect to the luminous flux, thereby limiting the performance of the control of the transmission of the lenses. It may furthermore turn out to be difficult to integrate a large number of sensors into one and the same ophthalmic system in order to enhance the reliability of the acquired measurement or measurements and to optimize the control of the ophthalmic system.

Finally, the control of the variation of a functionality of an optical element may also depend on other data specific to the user of the ophthalmic system, for example their personal sensitivity to light or their activities (reading, sport, driving). The control may also depend on external items of information, for example geolocation or meteorological data (presence of a close-by light source, grazing sun, tunnel passage/exit, etc.), as well as data related to the environment close to the user (presence of people speaking or of a big crowd for example).

The invention is aimed at solving at least partially the drawbacks set forth hereinabove and, more particularly, is aimed at controlling the variation of a functionality of an optical element, without the ophthalmic system necessarily having a large number of sensors, so as to provide the user with improved visual comfort.

Thus, the invention relates to a method for controlling an ophthalmic system comprising:
  at least one optical element,
  at least one measurement sensor,
  a communication interface for communicating with a communicating external electronic device,
  at least one processor linked to the optical element and able to control a variation of a functionality related to the optical element,
the method comprising the steps consisting in:
  acquiring at least one measurement by the sensor of the ophthalmic system,
  selecting at least one item of information obtained by a communicating external electronic device,
  determining an instruction on the basis of the measurement acquired by the sensor and of the item of information obtained by the communicating external electronic device, and
  executing the instruction by the processor so as to control the variation of the functionality related to the optical element.

The selection of certain external items of information combined with the measurement or measurements acquired by the sensors of the system makes it possible to improve the relevance of the instruction for controlling the variation of the functionality related to the optical element. The comfort afforded by the optical element is therefore substantially improved for the user.

According to one embodiment, the determination of the instruction is performed by the electronic device, the method furthermore comprising the step of:
  transmitting the instruction from the electronic device to the processor of the ophthalmic system before executing the instruction to control the variation of the functionality related to the optical element.

According to one embodiment, the determination of the instruction is performed by the processor of the ophthalmic system, the method furthermore comprising the step of:
  transmitting the selected item of information from the electronic device to the processor of the ophthalmic system before determining the instruction on the basis of the measurement acquired by the sensor and of the selected item of information.

According to one embodiment, the determination of the instruction on the basis of the measurement acquired by the sensor and of the item of information obtained by the electronic device is performed on the basis of a predetermined model of the functionality of the optical element.

In particular, after the control of the variation of the functionality related to the optical element, the method furthermore comprises the steps of:
  modifying from a man-machine interface the functionality of the ophthalmic system, and
  adapting the model of the functionality of the optical element as a function of the modification of the functionality performed from the man-machine interface.

According to one embodiment, the selected item of information is associated with a location and/or with a time period corresponding to that (those) of the measurement acquired by the sensor.

According to one embodiment, the measurement acquired by the sensor comprises at least one element from among:
  a proximity measurement;
  a geolocation measurement;
  an acceleration measurement;
  a gyroscopic measurement;
  a pressure measurement;
  a temperature measurement;
  a measurement for tracking a movement of at least one eye;
  a telemetry measurement;
  a collecting of energy, in particular a mechanical, electrical or thermal energy;
  an audio signal;
  a video signal;
  a measurement of luminous intensity, in at least one frequency band of the electromagnetic spectrum.

According to one embodiment, the electronic device is a mobile telephone, a digital tablet, a connected watch, a desktop computer, a laptop computer, a remote server accessible for example via the Internet, a device integrated into an automotive vehicle or into a GPS, a garment, a pair of shoes, a mask, an accessory connected or in a GPS, or a pair of spectacles comprising connected lenses.

According to one embodiment, the item of information obtained by the electronic device comprises at least one element or a combination of elements from among:
- a meteorological item of information;
- a geolocation item of information;
- a time-stamped item of information;
- an item of information relating to an environment of the user of the ophthalmic system.
- an item of information relating to a previously acquired measurement of the sensor and/or a previously controlled value of variation of functionality of the ophthalmic system.

According to one embodiment, a plurality of items of information is selected on the basis of a plurality of external electronic devices adapted to communicate with the communication interface of the ophthalmic system.

According to one embodiment, the optical element is an ophthalmic lens of electroactive type, and in which the variation of the functionality related to the lens comprises a modification of at least one characteristic of an electroactive cell included in the lens.

In particular, the optical element is an electrochromic lens, and in which the functionality related to the optical element comprises the transmission of the lens.

According to one embodiment, the method furthermore comprises the steps of:
- time-stamping the measurement acquired by the sensor and the item of information obtained by the electronic device, and
- storing the measurement and/or the item of information time-stamped in a memory of the electronic device or in an external database, the database being adapted to communicate with the electronic device by a data network.

According to one embodiment, the method furthermore comprises the steps of:
- geolocating the measurement acquired by the sensor and the item of information obtained by the electronic device, and
- storing the measurement and/or the item of information geolocated in a memory of the electronic device or in an external database, the database being adapted to communicate with the electronic device by a data network.

The invention also relates to a computer program comprising instructions for the implementation of the method according to the invention, when the computer program is executed by a processor.

The invention also relates to an assembly comprising:
- an ophthalmic system comprising:
  - at least one optical element,
  - at least one measurement sensor,
  - a communication interface for communicating with a communicating external electronic device, and
  - a processor linked to the optical element and able to control a variation of a functionality related to the optical element,
- an electronic device adapted to perform the following operations:
  - receive a measurement acquired by the sensor;
  - select at least one item of information;
  - determine, on the basis of the measurement acquired by the sensor and of the item of information, an instruction destined for the processor to control the variation of the functionality related to the optical element.

The invention is now described with the aid of the drawings, in which.

It should be noted that, in the figures, structural and/or functional elements common to the various embodiments may have the same references. Thus, unless otherwise mentioned, such elements have identical structural, dimensional and material properties.

For the sake of clarity, only the elements useful for understanding the embodiments described have been represented and will be described in detail.

Figure 1:
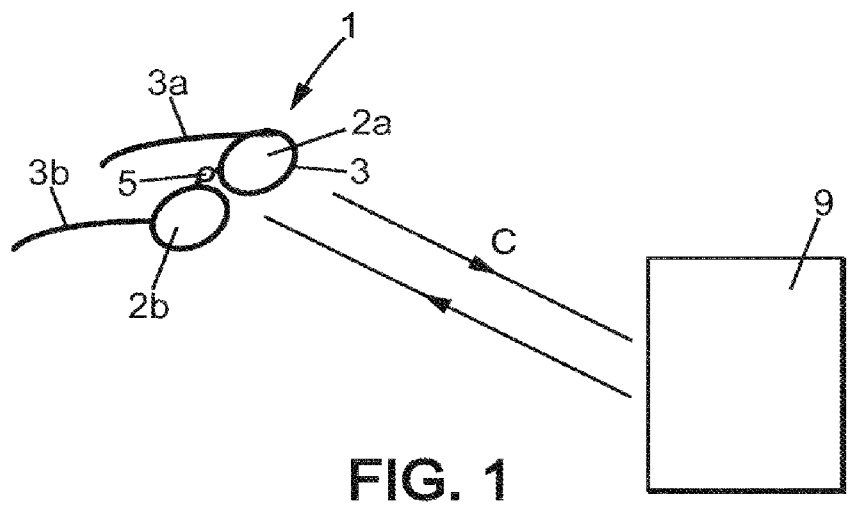
FIG. 1 is a schematic representation of an assembly comprising an ophthalmic system and an electronic device according to a first embodiment.

FIG. 1 is a schematic view of an assembly comprising an ophthalmic system 1 and a communicating external electronic device 9. By "external" is meant that the electronic device 9 is distinct from the, or else outside the, ophthalmic system 1.

The ophthalmic system 1 comprises at least one optical element 2. In particular, as shown in FIG. 1, the system 1 comprises a frame 3, in particular having two temples 3a, 3b. According to the embodiment of FIG. 1, the ophthalmic system 1 comprises two optical elements 2a, 2b mounted in the frame 3. Subsequently, the invention is described in relation to a single optical element 2. However, it is understood that the invention can also apply to an ophthalmic system 1 comprising several optical elements 2, as is illustrated in FIG. 1.

An optical element 2 can be any optical device intended to be placed in, on, close to, substantially facing or upstream of a vision organ, such as an eye, in the sense of a light ray generated by a light source. In particular, the optical element 2 is an ophthalmic lens mounted on the ophthalmic system 1, such as a pair of spectacles, intended for a human person.

Such an optical element 2 may or may not have a corrective effect. The optical element 2 may be by way of example opacifying (sunglasses) or informative (information display).

The optical element 2 comprises a variable functionality.

According to one embodiment, the optical element 2 is a lens of electroactive type. In this embodiment, the variation of the functionality related to the lens comprises a modification of at least one characteristic of an electroactive cell included in the lens.

By "electroactive lens" is meant an optical device for which at least one characteristic varies under the influence of an electrical and/or electromagnetic signal. Typically, a variation of the amplitude of an electrical signal applied to an electroactive lens modifies a functionality of this lens.

In one embodiment, the optical element 2 can be a lens with variation of amplitude for example with electrically controlled transmission, with tint variation (for example by virtue of liquid crystals), and/or with active polarization. More particularly, the optical element 2 may be an electrochromic lens, in which the functionality related to the optical element 2 comprises the transmission of the lens. The functionality may for example relate to turning on/turning off, the transmission level, the ranges of minimum/maximum transmission, the number and the value of transmission tiers in the case when using transmission tiers and/or the speed of transition between two transmission tiers of the optical element 2.

However, the invention is not limited to the electrochromic lens and may also relate to other types of electroactive lenses, such as liquid-crystal lenses («liquid crystal display—LCD") for example.

According to another embodiment, the optical element 2 is an informative lens, comprising for example a passive lens combined with a holographic mirror. The variation of the functionality of this optical element 2 thus makes it possible to display information on the lens destined for the user.

More generally, the optical element 2 may be any active device comprising a variation of a functionality.

Figure 2:
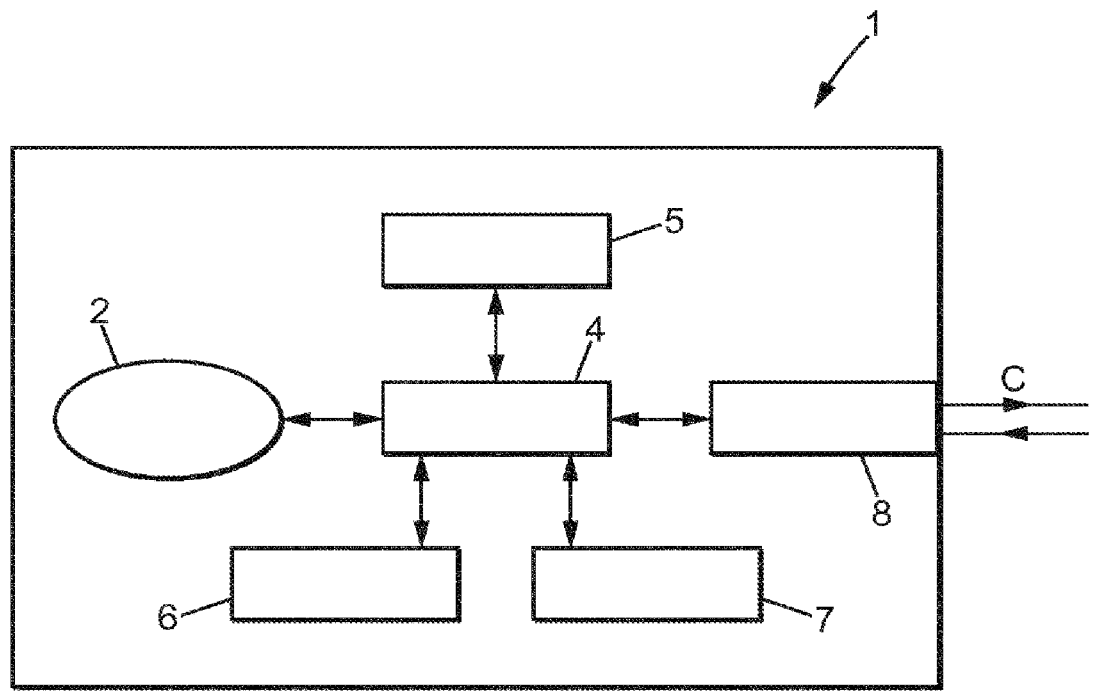
FIG. 2 is a schematic representation of the ophthalmic system of FIG. 1.

As illustrated schematically in FIG. 2, the ophthalmic system 1 comprises a processor 4 linked to the optical element 2 and able to control the variation of the functionality related to the optical element 2.

The ophthalmic system 1 also comprises a sensor 5, disposed on the frame 3 or directly at the level of an optical element 2. The sensor 5 is for example disposed at the level of the nose bridge of the frame 3 as illustrated in FIG. 1.

The sensor 5 can be an illumination sensor, such as a photodiode, or an illumination micro-sensor (also called ALS for "Ambient Light Sensor"). The sensor 5 can thus measure the illumination in the guise of luminous flux received per unit surface area (in lux or in $W \cdot m^{-2}$). As a variant, the sensor 5 can also measure other values of luminous flux, such as an intensity, or a visual or photometric luminance. The sensor 5 can for example measure the luminous flux in the visible and/or in the ultraviolet.

The sensor 5 can also be a light sensor adapted to measure a degree of polarization of the light, in particular so as to activate a polarization cutoff functionality. The sensor 5 can also be adapted to measure the visible and/or non-visible luminous spectrum so as to activate a wavelength-selective cutoff functionality.

The sensor 5 is thus adapted to measure the ambient luminous flux arriving at the ophthalmic system 1. By "ambient" is meant the luminous flux in which the ophthalmic system 1 lies. The ambient luminous flux therefore varies as a function of conditions outside the ophthalmic system 1, such as the meteorological conditions when the ophthalmic system 1 is outside, or of the lighting of a room when the ophthalmic system 1 is inside for example.

The measurement sensor 5 can also measure a parameter other than the luminous flux, and can thus be:
- a proximity sensor operating for example via a measurement of emission/reception time of an electromagnetic wave. The proximity measurement can be made between the ophthalmic system 1 and its user, between the ophthalmic system 1 and an external electronic device, between the ophthalmic system 1 and another ophthalmic system, etc.;
- a sensor of a location measurement, for example a geolocation measurement. The geolocation measurement can correspond to at least one element from among a geographical location (for example via a latitude and a longitude), a position in space (for example in a Galilean frame of reference), a measurement of proximity with respect to another object, a proximity or presence measurement at a particular site (cinema, restaurant, tourist site, etc.). Such a sensor is typically a GPS (for "global positioning system") device;
- an inclinometer for the acquisition of an inclination measurement, making it possible for example to determine the measurement of the user of the ophthalmic system 1;
- a gyroscope for the acquisition of a gyroscopic measurement;
- a telemeter for the acquisition of a distance measurement;
- a manometer for the acquisition of a pressure measurement;
- a thermometer for the acquisition of a temperature measurement;
- an "eye tracker" device (device for tracking the movement of the eye) able to acquire a measurement for tracking a movement of at least one eye of the user of the ophthalmic system 1;
- a microphone for the acquisition of a sound signal;
- a camera for the acquisition of a video signal, for example a plenoptic camera;
- a sensor of a measurement of luminous intensity, in at least one frequency band of the electromagnetic spectrum;
- a collection device able to collect electrical energy, for example acquired via a solar sensor (photovoltaic cell) or a sensor of mechanical energy (sensor of vibrations, for example on a person's face), thermal energy, etc.

The ophthalmic system 1 can furthermore comprise a plurality of sensors 5, in particular two sensors 5, measuring one and the same value or different values. Subsequently, the invention is described in relation to a single sensor 5. However, it is understood that the invention may also apply to an ophthalmic system 1 comprising a plurality of sensors 5.

The ophthalmic system 1 can comprise other elements, such as a battery 6 making it possible to energize the electronic components of the ophthalmic system 1. The ophthalmic system 1 can also comprise a memory 7 adapted to store parameters or data related to the functionality of the optical element 2. The fact that these data are stored directly in a memory 7 of the ophthalmic system 1 makes it possible to prevent them from being lost, for example in the case where these data were stored on another electronic device.

The ophthalmic system 1 also comprises a communication interface 8. The communication interface 8 is linked (for example via a wired or wireless link) to the optical element 2. The communication interface 8 is adapted to transmit/receive data between the ophthalmic system 1 and the electronic device 9.

The electronic device 9 can be a mobile telephone, a digital tablet, a connected watch, a desktop computer or a laptop computer, an remote server accessible for example via the Internet, a terminal integrated into an automotive vehicle or into a GPS, a dedicated terminal used for the manufacture and/or the configuration of ophthalmic lenses, a garment, a pair of shoes, a mask, an accessory connected or in a GPS. Generally, the electronic device 9 can be any electronic device able to be connected to the ophthalmic system 1.

The electronic device 9 can also comprise a sensor such as described hereinabove for the ophthalmic system 1 with the reference 5. In particular, the electronic device 9 can also be another ophthalmic system such as described hereinabove, for example a pair of spectacles.

The link between the electronic device 9 and the ophthalmic system 1 may be wired, wireless, optical, induction-based, etc.

More particularly, the ophthalmic system 1 can be connected to the electronic device 9 via a communication network C.

Thus, for a short-range radio link (typically less than 100 meters), the communication network C can be of Bluetooth (trademark), or ZigBee (trademark) type for uses at very low bitrate. The communication network C can also be of wifi type for uses at high bitrate or a home-automation oriented network. For a long-range radio link (typically greater than a kilometer), the communication network C can be of ZigFox (trademark), LORA (trademark) based on the LoRaWAN (for "Long Range Wide-area network") protocol, GSM (for "Global system for mobile communication"), 3G or 4G type.

For a short-range optical link (typically able to cover the interior of a room), the communication network C can be an LiFi (trademark) network or a QI network for a very short range magnetic induction link.

Other protocols may be used, such as for example an IP, Ethernet, TCP/UDP, Internet network, a network using a universal asynchronous transmitter-receiver, for example of UART (Universal Asynchronous Receiver Transmitter) type, a network relying on the http protocol (Hyper Text Transfer Protocol), etc.

The electronic device 9 can also be connected to a data network D. By "data network" is meant any type of network able to provide complementary data to the data of the communication network C. In one embodiment, the data network D is distinct from the communication network C. In particular, when the communication network C is a local area network (for example bluetooth), the data network D may for example be a wide area network (for example Internet via a 4G connection).

The method of controlling the variation of the functionality, related to an optical element 2, is described hereinafter according to a first embodiment of the invention, illustrated by FIG. 1. According to this first embodiment, a single user of an ophthalmic system 1 is considered, for example a wearer of a pair of spectacles.

In a first step of the method, known as the measurement acquisition step, a measurement by the sensor 5 of the ophthalmic system 1 is acquired.

In a second step of the method, the acquired measurement is transmitted to a communicating external electronic device 9. The measurement is in particular transmitted by the communication interface 8 of the ophthalmic system 1 to the electronic device 9 via the communication network C.

During this second step, it is also possible to transmit other data related to the optical element 2 and which may be used to determine the instruction for the control of the variation of the functionality. These data may relate to the profile of the user, in particular their preferences relating to their light sensitivity for example. These data may also relate to usage data of the ophthalmic system 1, such as the number of operating hours, current consumption, statistics on the transmission levels used, statistics on the dynamics of change of transmission, the level of the battery 6, etc. These data transmitted by the ophthalmic system 1 to the electronic device 9 are referred to as internal subsequently.

In a third step, known as the obtaining step, the electronic device 9 obtains, in addition to the internal data, one or more items of information.

The items of information obtained be data previously stored in a memory (not represented) of the electronic device 9 or measured by a sensor of the electronic device 9 if relevant. The items of information can also be stored previously in a database 10 and transmitted to the electronic device 9 by a server 11 via the data network D. Thus, the items of information obtained by the electronic device 9 are referred to as external, as opposed to the internal data originating from the ophthalmic system 1 of the user.

The external item or items of information obtained by the electronic device 9 comprise at least one element or a combination of elements from among:

- a meteorological item of information (for example local data in respect of pressure, hygrometry, temperature, sunshine, wind speed, rain/snow fall, etc.);
- a geolocation item of information, making it possible in particular to determine an activity of the user of the ophthalmic system 1 (if the user is in the restaurant or in the cinema for example);
- a time-stamped item of information;
- an item of information relating to an environment of the user of the ophthalmic system 1, for example relating to the presence of an obstacle, of a particular place (such as a tunnel) or of other people in proximity to the user of the ophthalmic system 1; and/or
- an item of information relating to a previously acquired measurement of the sensor and/or a previously controlled value of variation of functionality of the ophthalmic system 1.

In a fourth step of the method, known as the selection or aggregation step, at least one item of information obtained by the electronic device 9 is selected. In particular, the selected item of information preferably corresponds to a location and/or to a time period corresponding to that (those) of the measurement acquired by the sensor 5 of the ophthalmic system 1. It is thus possible to associate transmitted internal data ophthalmic system 1 and external items of information corresponding to identical or close measurements of time/location. It is also possible to select several items of information if necessary.

In a fifth step, an instruction is determined at least on the basis of the measurement acquired by the sensor and of the selected item of information.

According to one embodiment, the determination of the instruction is performed by the processor 4 of the ophthalmic system 1. According to this embodiment, the selected item of information is previously transmitted from the electronic device 9 to the processor 4 of the ophthalmic system 1 before determining the instruction on the basis of the measurement acquired by the sensor 5 and of the selected item of information.

According to another preferred embodiment, the determination of the instruction is performed by a processor (not represented) of the electronic device 9. Indeed, the electronic device 9 could have a greater calculation power than that of the ophthalmic system 1, and could therefore determine more rapidly the instruction for controlling the variation of the functionality of the optical element 2. This also makes it possible to limit the consumption of the energy stored by the battery 6 of the ophthalmic system 1, and therefore to increase the duration of autonomy of the ophthalmic system 1.

According to one embodiment, the determination of the instruction on the basis of the measurement acquired by the sensor 5 and of the selected item of information is performed on the basis of a predetermined model of the functionality of the optical element 2. The model of the functionality can be of any type, and in particular based on fuzzy logic or on modal logic. The model of the functionality thus comprises at least as input data the value of the measurement acquired by the sensor 5 as well as the selected item of information.

The model can also take into account other input parameters, such as other internal data relating to the ophthalmic system 1 or the user.

By way of purely illustrative example, the model may provide that, when the user situated in a particular place, for example at their work desk, the optical element 2 must allow the entirety of the light to pass through, whatever the luminous flux measured by a sensor 5 of the ophthalmic system 1. The model then determines an instruction in this sense, intended to be transmitted to the optical element 2.

According to another example, the model may provide that, when the user is driving (the electronic device 9 being for example the cars onboard computer), the optical element 2 must constantly be opacifying so that the user enjoys better visibility throughout their journey. The model then determines an instruction for controlling a constant reduced transmission value of the optical element 2 as long as the items of information obtained by the electronic device 9 indicate that the user is in the car or that they are driving it.

According to yet another example, the model may make provision to decrease the transmission of the optical element 2 of the user when the latter is in the presence of people speaking. The model then determines a reduced level of transmission as a function of the luminous intensity in which the user finds themselves measured by the sensor 5, and as a function of the items of information obtained by the electronic device 9 indicating the presence of other people around the user.

In a sixth step, the instruction is transmitted to the processor 4 of the ophthalmic system 1, in particular via the communication interface 8 of the ophthalmic system 1 if relevant.

Finally, in a seventh step, the processor 4 of the ophthalmic system 1 executes the instruction to control the variation of the functionality related to the optical element 2.

Thus, the functionality of the optical element 2 can be controlled in an automatic manner. By "automatic" is meant that it is not necessary for there to be any physical interaction with the user of the ophthalmic system in order to control the functionality of the optical element 2. In particular, the ophthalmic system 1 preferably does not comprise any means making it possible to interact with the user of the ophthalmic system 1, for example a touch-sensitive interface or a button.

However, in an optional eighth step, if the user is not satisfied with the variation of the functionality of the optical element 2, they can modify the functionality of the ophthalmic system from a man-machine interface. According to this eighth step, the model can be adapted by training as a function of the modification of the functionality performed by the user. The model of the functionality of the optical element can thus be modified and be progressively optimized to arrive at better comfort and a preferred control setting of the user of the ophthalmic system 1.

According to one embodiment, all the data necessary for the modification of the functionality as well as the control model can be stored in the memory 7 of the ophthalmic system 1. Thus, the ophthalmic system 1 can make it possible to access these data from a man-machine interface of an electronic device. Access to the man-machine interface from the electronic device can also make it possible to perform updates, troubleshoot the ophthalmic system 1, save a user profile, etc.

Once transmitted to the electronic device 9, the internal data, in particular the measurement of the sensor 5, and the external item of information obtained by the electronic device, can be time-stamped and then stored in a memory (not represented) of the electronic device 9. As a variant, the internal data and the external items of information are stored in an external database 10, the database 10 being adapted to communicate with the electronic device 9 through the data network D.

In the same way, the internal data transmitted by the ophthalmic system, and in particular the measurement of the sensor 5, and the external item of information obtained by the electronic device 9, can be geolocated and then stored in a memory of the electronic device 9 or in the database D.

These internal data and external items of information acquired previously and which relate to the history of use of the ophthalmic system 1 can thus be reused subsequently. In particular, they may make it possible to preserve certain data relating to the user, for example the history of the meteorology in the zone of the user, the activities carried out by the user, their past location, etc.

It is also possible to track the history of certain data relating to the optical element 2, for example the rate of turning on/turning off of the optical element 2, its transmission or displayed images to know whether the user is in the reading phase.

Thus, the internal data and the external items of information previously acquired and then stored can be used in such a way as to improve the comfort of the user, to allow tracking of items of information relating to the user (rate of exposure to UV for example or consumption of the ophthalmic system 1), to monitor potential malfunctions of the ophthalmic system 1 (consumption of the ophthalmic system 1, difficulties in achieving the desired functionality related to the optical element 2, etc.). On account of the transmission of these internal data and the external items of information, the tracking and/or the command of the ophthalmic system 1 can in particular be carried out remotely.

Figure 3:
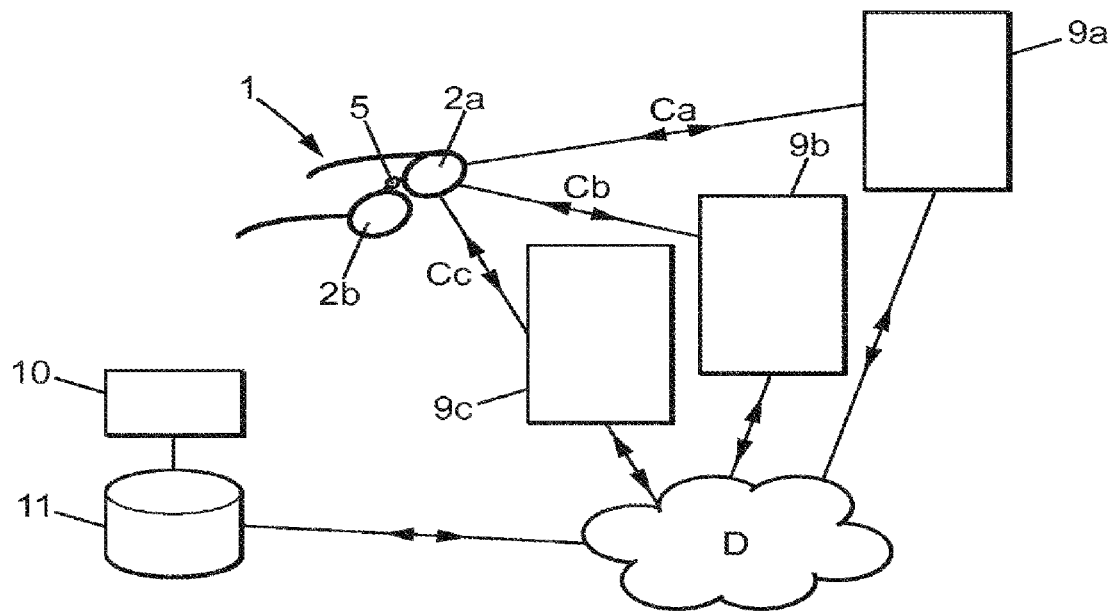
FIG. 3 is a schematic representation of an assembly comprising an ophthalmic system and a plurality of electronic devices according to a second embodiment.
Figure 4:
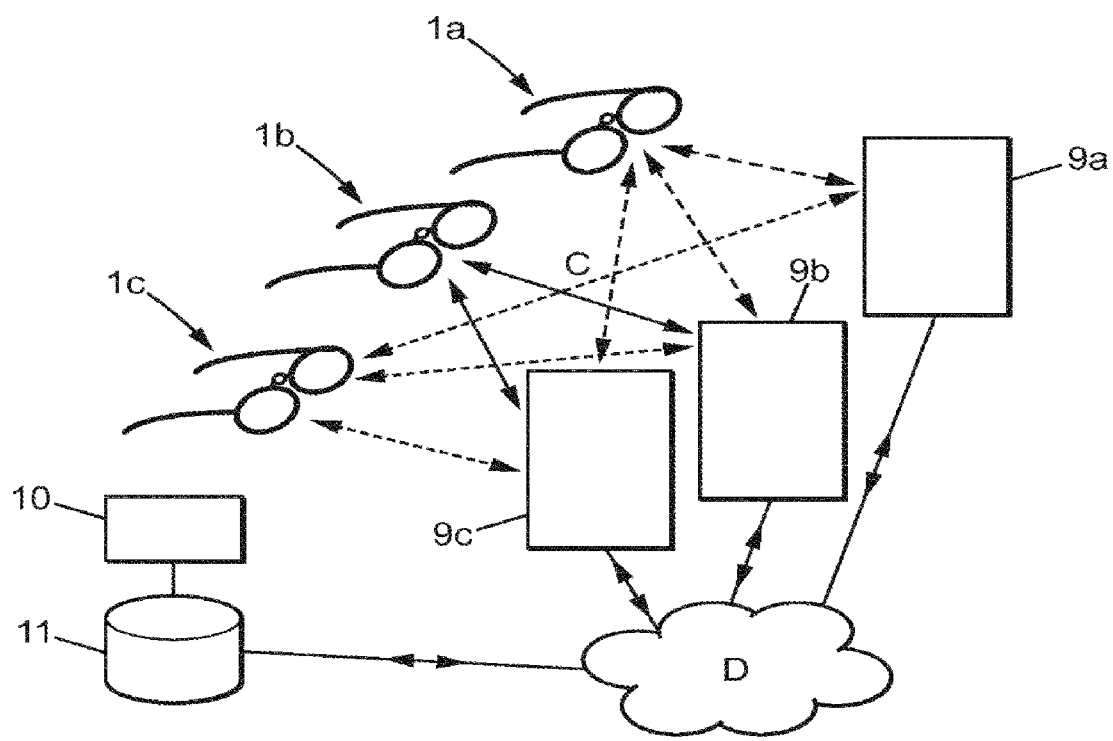
FIG. 4 is a schematic representation of an assembly comprising a plurality of optical systems and a plurality of electronic devices according to a third embodiment.

The method according to a second and a third embodiment of the invention, illustrated respectively by FIGS. 3 and 4, is described hereinafter.

According to the second embodiment, an assembly comprises an ophthalmic system 1 and a plurality of communicating external electronic devices 9a, 9b, 9c. According to this second embodiment, the ophthalmic system can transmit and/or receive external items of information originating from the various electronic devices 9a, 9b, 9c. By way of example, each electronic device 9a, 9b, 9c can transmit through one and the same communication network C or several different networks Ca, Cb, Cc, external items of information necessary for determining the control instruction for the functionality, related to the optical element 2.

According to the third embodiment, an assembly comprises a plurality of ophthalmic systems 1a, 1b, 1c and a plurality of communicating external electronic devices 9a, 9b, 9c. According to this third embodiment, the ophthalmic system 1a can transmit and/or receive external items of information originating from the various electronic devices 9a, 9b, 9c as well as other ophthalmic systems 1b, 1c.

Thus, the users of the other ophthalmic systems, can transmit data making it possible to determine the control of the variation of the functionality related to the optical element 2.

By way of example, a set of wearers distributed in a geographical zone can separately measure data relating to the ambient brightness. On the basis of these measurements and of geographical and meteorological items of information obtained by the electronic devices 9a, 9b, 9c, it may be possible to anticipate an imminent change of brightness for the user due to the passage of a group of clouds for example, and which has already measured by certain other wearers. In the same way, it may be possible to anticipate the presence of a forthcoming obstacle, such as a passage under a tunnel.

Very obviously, the invention is not limited to the embodiments described above and provided solely by way of example. It encompasses various modifications, alternative forms and other variants that a person skilled in the art will be able to envisage within the context of the present invention and in particular any combinations of the various modes of operation described above, which can be taken separately or in combination.

The invention claimed is:

1. A method for controlling an ophthalmic system including at least one optical element, at least one measurement sensor, at least one communication interface for communicating with a communicating external electronic device, which is outside the ophthalmic system, at least one processor linked to the optical element and configured to control a variation of a functionality related to the optical element, the method comprising:
    acquiring at least one measurement by the at least one measurement sensor of the ophthalmic system;
    selecting at least one item of information obtained by the communicating external electronic device;
    determining an instruction based on the measurement acquired by the at least one measurement sensor and on the at least one item of information obtained by the communicating external electronic device; and
    executing the instruction by the processor to control the variation of the functionality related to the optical element.

2. The method as claimed in claim 1, wherein the determining the instruction is performed by the electronic device, the method further comprising:
    transmitting the instruction from the electronic device to the processor of the ophthalmic system before executing the instruction to control the variation of the functionality related to the optical element.

3. The method as claimed in claim 1, wherein the determining the instruction is performed by the processor of the ophthalmic system, the method further comprising:
    transmitting the selected item of information from the electronic device to the processor of the ophthalmic system before determining the instruction based on measurement acquired by the sensor and of the selected item of information.

4. The method as claimed in claim 1, wherein the determining the instruction based on the measurement acquired by the sensor and of the item of information obtained by the electronic device is performed based on a predetermined model of the functionality of the optical element.

5. The method as claimed in claim 4, wherein, after the control of the functionality related to the optical element, the method further comprises:
    modifying from a man-machine interface the variation of the functionality of the ophthalmic system; and
    adapting the model of the functionality of the optical element as a function of the modification of the functionality performed from the man-machine interface.

6. The method as claimed in claim 1, wherein the selected item of information is associated with a location and/or with a time period corresponding to that of the measurement acquired by the sensor.

7. The method as claimed in claim 1, wherein the measurement acquired by the sensor comprises at least one element from among:
    a proximity measurement;
    a geolocation measurement;
    an acceleration measurement;
    a gyroscopic measurement;
    a pressure measurement;
    a temperature measurement;
    a measurement for tracking a movement of at least one eye;
    a telemetry measurement;
    a collecting of energy;
    a audio signal;
    a video signal;
    a measurement of luminous intensity in at least one frequency band of the electromagnetic spectrum.

8. The method as claimed in claim 1, wherein the electronic device is a mobile telephone, a digital tablet, a connected watch, a desktop computer, a laptop computer, a remote server accessible via the Internet, a device integrated into an automotive vehicle, a garment, a pair of shoes, a mask, an accessory or a pair of spectacles comprising connected lenses.

9. The method as claimed in claim 1, wherein the item of information obtained by the electronic device comprises at least one element or a combination of elements from among:
    a meteorological item of information;
    geolocation item of information;
    a time-stamped item of information;
    an item of information relating to an environment of the user of the ophthalmic system;
    an item of information relating to a previously acquired measurement of the sensor and/or a previously controlled value of variation of functionality of the ophthalmic system.

10. The method as claimed in claim 1, wherein a plurality of items of information is selected based on a plurality, of external electronic devices configured to communicate with the communication interface of the ophthalmic system.

11. The method as claimed in claim 1, wherein the optical element is an electroactive ophthalmic lens, in which the variation of the functionality related to the lens comprises a modification of at least one characteristic of an electroactive cell included in the lens.

12. The method as claimed in claim 11, wherein the optical element is an electrochromic lens, in which the functionality related to the optical element comprises transmission of the lens.

13. The method as claimed in claim 1, further comprising:
    time-stamping die measurement acquired by the sensor and the item of information obtained by the electronic device; and
    storing the measurement and/or the item of information time-stamped in a memory of the electronic device or in an external database, the database configured to communicate with the electronic device by a data network.

14. The method as claimed in claim 1, further comprising:
    geolocating the measurement acquired by the sensor and the item of information obtained by the electronic device, and
    storing the measurement and/or the item of information geolocated in a memory of the electronic device or in an external database, the database configured to communicate with the electronic device by a data network.

15. A non-transitory computer readable storage medium, with a program stored there on, the program comprising instructions for implementing the method of claim 1, when the computer program is executed by a processor.

16. An assembly comprising:
an ophthalmic system including:
- at least one optical element,
- at least one measurement sensor,
- at least one communication interface communicating with a communicating external electronic device, and
- at least one processor linked to the optical element and configured to control a variation of a functionality related to the optical element; and a communication external electronic device, which is outside the ophthalmic system, adapted to:
- receive a measurement acquired by the sensor,
- select at least one item of information, and
- determine, based on the measurement acquired the sensor and on the item of information, an instruction destined for the processor to control the variation of the functionality related to the optical element.

* * * * *